(12) United States Patent
Chen et al.

(10) Patent No.: US 12,222,280 B1
(45) Date of Patent: Feb. 11, 2025

(54) SELF-ADAPTIVE ALL-FIBER LASER ULTRASONIC MEASURING INSTRUMENT

(71) Applicant: ZHEJIANG UNIVERSITY, Zhejiang (CN)

(72) Inventors: Jian Chen, Zhejiang (CN); Zhenyang Yu, Zhejiang (CN); Yike Zeng, Zhejiang (CN); Bingfeng Ju, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 0 days.

(21) Appl. No.: 18/919,443

(22) Filed: Oct. 18, 2024

Related U.S. Application Data

(63) Continuation of application No. PCT/CN2022/109944, filed on Aug. 3, 2022.

(30) Foreign Application Priority Data

Apr. 19, 2022 (CN) .......................... 202210409627.7

(51) Int. Cl.
   *G01N 21/17* (2006.01)
(52) U.S. Cl.
   CPC . *G01N 21/1702* (2013.01); *G01N 2021/1706* (2013.01); *G01N 2201/06113* (2013.01); *G01N 2201/08* (2013.01)
(58) Field of Classification Search
   CPC ........... G01N 21/1702; G01N 21/1704; G01N 21/1706; G01N 21/1717; G01N 21/1719;
   (Continued)

(56) References Cited

U.S. PATENT DOCUMENTS 8,958,060 B2 * 2/2015 Chen ................. G01M 11/3145
                                                       356/73.1
11,546,063 B1 * 1/2023 Qureshi ................ H01S 5/1096
   (Continued)

FOREIGN PATENT DOCUMENTS

CN          203745385           7/2014
CN          204101015           1/2015
   (Continued)

OTHER PUBLICATIONS

"International Search Report (Form PCT/ISA/210) of PCT/CN2022/109944," mailed on Jan. 20, 2023, pp. 1-5.
   (Continued)

*Primary Examiner* — Suman K Nath
(74) *Attorney, Agent, or Firm* — JCIPRNET

(57) ABSTRACT

Disclosed are a self-adaptive all-fiber laser ultrasonic measuring instrument and a measuring method thereof. The output light of a narrow-linewidth semiconductor fiber laser is split by a polarization controller and a polarization beam splitter to generate detection light and reference light. The detection light and visible light output by an indication laser are irradiated, through a wavelength division multiplexer and a biaxial scanning galvanometer, to a sample under test to generate ultrasonic vibration. The scattered light modulated by the ultrasonic vibration is converged and collected as signal light. The signal light and the reference light are respectively input into an interferometer from two ends of the interferometer in opposite propagation directions. The reference light demodulated by the interferometer generates a feedback control signal for adjusting the measurement performance of the interferometer. The signal light demodulated by the interferometer generates an ultrasonic signal to achieve ultrasonic measurement of the sample.

18 Claims, 3 Drawing Sheets

(58) Field of Classification Search
CPC .......... G01N 21/1725; G01N 21/1753; G01N 21/17; G01N 2021/1706; G01N 2201/06113; G01N 2201/08
See application file for complete search history.

(56) References Cited

U.S. PATENT DOCUMENTS

| | | | |
|---|---|---|---|
| 2015/0204790 A1* | 7/2015 | Yonetani | G01N 21/65 356/301 |
| 2016/0091429 A1* | 3/2016 | Huber | H01S 3/302 356/301 |
| 2018/0080906 A1 | 3/2018 | Ishiyama | |

FOREIGN PATENT DOCUMENTS

| | | |
|---|---|---|
| CN | 105865751 | 8/2016 |
| CN | 108507981 | 9/2018 |
| CN | 114324177 | 4/2022 |
| CN | 114813576 | 7/2022 |
| JP | 2016090280 | 5/2016 |
| WO | 2022029867 | 2/2022 |

OTHER PUBLICATIONS

"Written Opinion of the International Searching Authority (Form PCT/ISA/237) of PCT/CN2022/109944," mailed on Jan. 20, 2023, pp. 1-6.

* cited by examiner

SELF-ADAPTIVE ALL-FIBER LASER ULTRASONIC MEASURING INSTRUMENT

CROSS-REFERENCE TO RELATED APPLICATION

This application is a continuation of international PCT application serial no. PCT/CN2022/109944, filed on Aug. 3, 2022, which claims the priority benefit of China application no. 202210409627.7, filed on Apr. 19, 2022. The entirety of each of the above-mentioned patent applications is hereby incorporated by reference herein and made a part of this specification.

BACKGROUND

Technical Field

The present disclosure relates to an optical fiber measuring instrument in the field of laser ultrasonic measurement technology, specifically pertaining to a self-adaptive all-fiber laser ultrasonic measuring instrument and a measurement method thereof.

Description of Related Art

Laser ultrasonics is a fully non-contact measurement technique that utilizes lasers to generate and detect ultrasonic signals in sample under tests without the need for any coupling agents. This methodology is particularly suitable for in-situ measurements of various components in extreme environments characterized by high temperature, high pressure, intense radiation, or severe corrosion, as well as for high-speed moving or structurally complex parts. In comparison to conventional piezoelectric ultrasonic detection systems, laser ultrasonic systems offer distinct advantages, including: long-distance non-contact capability (up to 10 meters or more), multiple modal capabilities, broad frequency bandwidth, high resolution, wide range of applications and so on. Consequently, laser ultrasonic detection technology has garnered significant attention from researchers both domestically and internationally. Typically, a laser pulse is directed onto the surface of the sample under test, generating thermal expansion stress that excites ultrasonic waves. These waves are subsequently detected using optical methods. Laser ultrasonics is particularly well-suited for various industrial applications, such as the measurement of high-temperature steel pipes, coating thickness, and complex-shaped composite materials. However, the stability of laser ultrasonic detection technology can be severely compromised by the complex industrial environments, including high temperatures and vibrations. Furthermore, inconsistencies in the surface quality of sample under tests can lead to significant fluctuations in the amplitude of laser ultrasonic echo signals. Additionally, the optical path of laser ultrasonic detection devices is complex, and the equipment is often bulky, making it challenging to integrate with scanning technologies for comprehensive inspection of sample under tests.

A current limitation of laser ultrasonic measurement systems based on Fabry-Perot interferometers is the difficulty in maintaining long-term stability at optimal sensitivity. This is due to the fact that industrial environments with high temperatures, vibrations, and other factors can easily cause changes in the cavity length of the Fabry-Perot interferometer or laser frequency drift. To achieve optimal detection performance, the cavity length of the Fabry-Perot interferometer must be capable of adaptive adjustment to compensate for changes in cavity length caused by laser frequency drift and thermal expansion, in response to environmental conditions and self-deformation.

SUMMARY

In order to overcome the above-mentioned deficiencies of the related art, the present disclosure provides a self-adaptive all-fiber laser ultrasonic measuring instrument and a measuring method thereof, and also provides an automatic compensation method for laser ultrasonic echo signals based on normalization.

The present disclosure is characterized by high environmental adaptability, high measurement sensitivity, compact structure, enhanced portability, ease of maintenance and adjustment, etc.

The technical solution adopted by the present disclosure is as follows.

1. A self-adaptive all-fiber laser ultrasonic measuring instrument includes a narrow-linewidth semiconductor fiber laser; a first fiber polarization controller; a first fiber polarization beam splitter; a first fiber circulator; a second fiber polarization controller; an interferometer; a wavelength division multiplexer; an indication laser; a fiber collimator; a biaxial scanning galvanometer; a light converging collector; a collimating lens; a second fiber circulator and a third fiber polarization controller.

The output terminal of the narrow-linewidth semiconductor fiber laser is connected to the input terminal of the first fiber polarization controller and the first fiber polarization beam splitter. An output terminal of the first fiber polarization beam splitter is connected to the first port of the first fiber circulator. The second port of the first fiber circulator is connected to one end of the interferometer through the second fiber polarization controller.

The other output terminal of the first fiber polarization beam splitter and the indication laser are jointly connected to the two input terminals of the wavelength division multiplexer. The output terminal of the wavelength division multiplexer is connected to the fiber collimator. The output collimated beam of the fiber collimator is irradiated to the sample under test through the biaxial scanning galvanometer. A light converging collector is disposed above the sample under test. The light converging collector receives the scattered light from the sample under test and then enters the collimating lens. The collimating lens is connected to the first port of the second fiber circulator, and the second port of the second fiber circulator is connected to the other end of the interferometer through the third fiber polarization controller.

A narrow-linewidth semiconductor fiber laser emits a continuous laser, which is polarized by the first fiber polarization controller to form orthogonally and linearly polarized light with p-polarization state and s-polarization state, and is split by the first fiber polarization beam splitter to form linearly polarized light with p-polarization state and linearly polarized light with s-polarization state.

The linearly polarized light in the s-polarization state serves as the reference light. The reference light is incident into the second fiber polarization controller through the first fiber circulator, and is input into the interferometer after being polarized by the second fiber polarization controller.

The linearly polarized light in the p-polarization state serves as the detection light. The detection light and the visible light output by the indication laser are jointly multiplexed by the wavelength division multiplexer and then input to the fiber collimator. The fiber collimator outputs spatial free light. The spatial free light generates ultrasonic vibrations when being irradiated on the sample under test after passing through the biaxial scanning galvanometer, and is scattered on the surface of the sample under test to generate a scattered light modulated by the ultrasonic vibration. The scattered light is collected and converged by the light converging collector and then incident on the collimating lens, and becomes a signal light after passing through the collimating lens. The signal light is incident into the third fiber polarization controller through the second fiber circulator, and is input into the interferometer after being polarized by the third fiber polarization controller.

Both the reference light and the signal light are reflected and transmitted in the interferometer.

The signal light transmitted by the interferometer and the reference light reflected by the interferometer are combined and incident into the first fiber circulator through the second fiber polarization controller, and are output from the third port of the first fiber circulator.

The reference light transmitted by the interferometer and the signal light reflected by the interferometer are combined and incident into the second fiber circulator through the third fiber polarization controller, and are output from the third port of the second fiber circulator.

The fiber polarization controller is a three-ring mechanical fiber polarization controller. The second fiber polarization controller and the third fiber polarization controller have a polarization of one-quarter wavelength. The first fiber polarization controller changes the polarization state of linearly polarized light into an elliptically polarized state, and the ratio of p-polarized light to s-polarized light is 90:10.

The first fiber polarization controller is configured to perform polarization processing, using the fiber to generate birefringence under the action of external force, and changing the polarization state of linearly polarized light into any elliptical polarization state including the orthogonal components with p-polarization state and s-polarization state. The specific principle is: the three rings are equivalent to three wave plates: $\lambda/4$, $\lambda/2$, and $\lambda/4$ respectively. The light wave passes through a quarter-wave plate ($\lambda/4$ plate) and is converted into linearly polarized light. Subsequently, the light wave undergoes adjustment of its polarization direction by means of a half-wave plate ($\lambda/2$ plate). Finally, the linearly polarized light is subjected to a quarter-wave plate ($\lambda/4$ plate), which alters its polarization state to an arbitrary polarization state. By rotating the quarter-wave plate and half-wave plate through 180 degrees utilizing a polarization controller, it is possible to achieve rotational changes in the polarization state.

A second fiber polarization beam splitter and a third fiber polarization beam splitter are further included; the input terminal of the second fiber polarization beam splitter is connected to the third port of the first fiber circulator, and the two output terminals of the second fiber polarization beam splitter are respectively connected to a photodetector. The input terminal of the third fiber polarization beam splitter is connected to the third port of the second fiber circulator, and the two output terminals of the third fiber polarization beam splitter are also respectively connected to a photodetector.

A feedback control system is further included, which is respectively connected to the output terminal port of the reference light that is output by the second fiber polarization beam splitter and the third fiber polarization beam splitter and is reflected and transmitted by the interferometer. The feedback control system receives the reference light that has been reflected/transmitted by the interferometer, and then processes and feedbacks the reference light to the interferometer to adjust the detection sensitivity of the interferometer in real time.

A data acquisition card is further included, the data acquisition card is respectively connected to the output terminal port of the signal light that is output by the second fiber polarization beam splitter and the third fiber polarization beam splitter and is reflected and transmitted by the interferometer. The signal light that is reflected and transmitted by the interferometer is collected and received by the data acquisition card and used as a laser ultrasonic signal, and then the surface quality of the sample under test is detected and identified.

The sample under test is placed on the platform and generates ultrasonic vibration after being irradiated by the laser of the biaxial scanning galvanometer. The ultrasound is generated by a pulse laser, that is, a laser pulse is irradiated onto the surface of the sample under test to generate thermal expansion stress, thereby exciting ultrasonic waves.

Specifically, the sample under test is high-temperature steel pipes, coatings and complex-shaped composite materials.

The interferometer is a Fabry interferometer.

By adjusting the cavity length of the interferometer, the transmission/reflection curves of the interferometer are adjusted, and the amplitude and slope corresponding to the fixed operating frequency of the interferometer are adjusted, thereby adjusting the sensitivity.

The optical fibers used in the present disclosure are all polarization-maintaining optical fibers.

In the implementation of the present disclosure, the sample under test is irradiated by a pulse laser beam and excited to generate ultrasonic waves. In the meantime, the ultrasonic waves generated based on the thermal expansion effect will cause phase changes in the detection light. Then, the scattered light modulated by the ultrasonic vibration signal is input to the interferometer. The interferometer converts the phase modulation of the input light into amplitude modulation through demodulation.

2. A measurement method of a self-adaptive all-fiber laser ultrasonic measuring instrument is provided.

Light is split to generate a reference light and a detection light. The detection light is incident on the target object of the sample under test to modulate ultrasonic vibration. The scattered light scattered by the sample under test is converged and collected and coupled to the optical fiber after photoelectric conversion to obtain the signal light that is modulated by ultrasonic vibration. The signal light and the reference light are input into the interferometer through the fiber circulator and the polarization controller. The signal light and the reference light are output through interference in the inner cavity of the interferometer. The reference light output by the interference is generated by the photodetector to generate a feedback control signal, which is then used to adjust the cavity length of the interferometer. Then the feedback adjustment optimizes the detection sensitivity performance of the interferometer. The signal light output from the interference outputs an ultrasonic signal generated by the photodetector to achieve ultrasonic measurement of the sample under test.

The reference light and detection light are generated by polarized beam splitting of the light source. The detection light is guided by a biaxial galvanometer and incident on the sample under test. The signal light is scattered by the object under test and collected through an optical lens group. The signal light is phase-modulated by the ultrasonic waves in the target under test.

During the measurement process, the following method is used for signal compensation: the laser ultrasonic signals scanned and collected at different positions by the biaxial scanning galvanometer are combined into a combined signal, and the combined signal is subjected to Hilbert transformation and then envelope processing is performed to obtain the surface wave envelope signal. The signal with the largest amplitude among the surface wave envelope signals is taken as the reference signal, and each surface wave envelope signal is normalized according to the reference signal. After normalization, the signal intensity and signal-to-noise ratio of areas with poor surface quality of the sample under test are improved, and then the processed combined signal is formed into an image. Areas with poor quality may also be clearly displayed on the same image, thus achieving high-sensitivity measurement of the surface of the sample under test.

The laser ultrasonic signal with the largest surface wave envelope signal amplitude is the reference signal.

The laser ultrasonic signal is normalized according to the reference signal and the surface wave envelope signal.

Through the above-mentioned signal compensation processing, the present disclosure makes it possible to improve the signal intensity and signal-to-noise ratio of areas with poor surface quality of the sample under test, realize complete detection of the sample under test with poor surface consistency, and significantly improve the subsequent determination of defects or accuracy of measurement of coating thickness.

In the present disclosure, the narrow-linewidth semiconductor fiber laser outputs light, which is split by a polarization controller and a polarization beam splitter to generate a detection light and a reference light. The detection light is irradiated to the sample under test through the wavelength division multiplexer and biaxial scanning galvanometer, and the scattered light modulated by ultrasonic vibration is converged and collected as signal light for input. The signal light and reference light are input to the interferometer from both ends of the interferometer in opposite propagation directions. The reference light demodulated by the interferometer generates a feedback control signal, which is configured to adjust the cavity length of the interferometer to maintain working with long-term stability at optimal detection sensitivity. The signal light demodulated by the interferometer generates an ultrasonic signal to achieve ultrasonic measurement of the sample under test, including thickness, defects, material properties, etc.

Compared with the related art, the advantageous effects of the present disclosure are:

1) The disclosure has high environmental adaptability and is able to adaptively compensate in real time for laser frequency drift caused by changes in the industrial site environment and changes in cavity length caused by thermal expansion and deformation of the interferometer.
2) The measurement sensitivity of the present disclosure is high and may adaptively amplify low signal-to-noise ratio signals caused by weak scattering on the surface of the sample under test.
3) The disclosure has compact structure and high portability.
4) The present disclosure facilitates convenient maintenance and adjustment.

Figure 1:
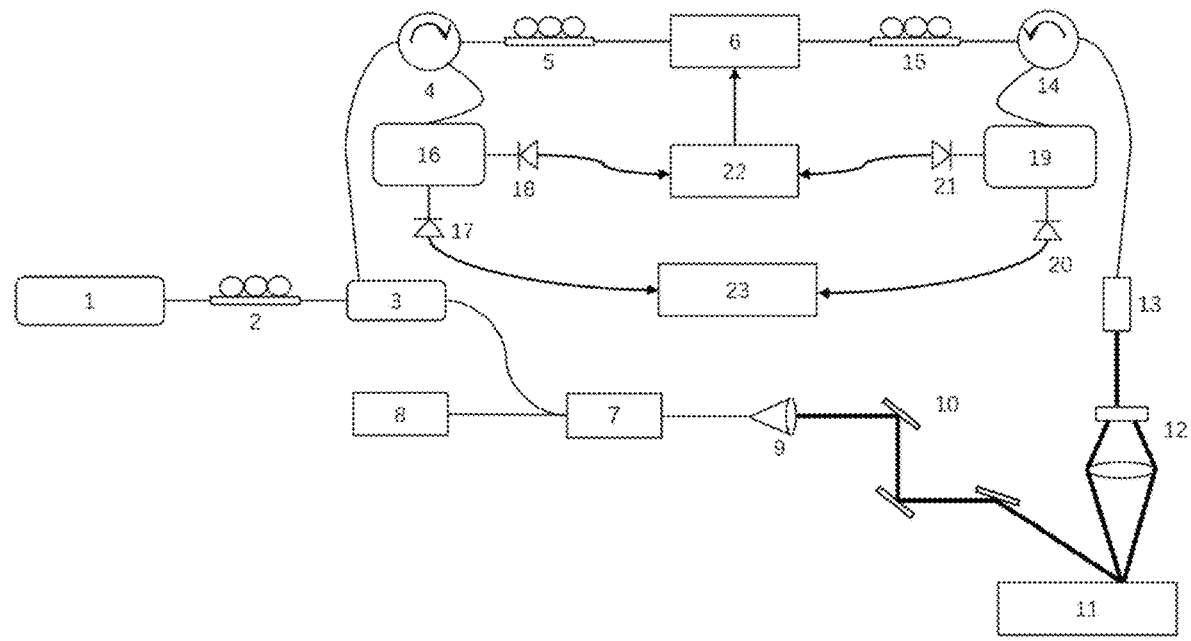
FIG. 1 is an implementation block diagram of the laser ultrasonic measurement system of the present disclosure.

In the figures: narrow-linewidth semiconductor fiber laser (1), first fiber polarization controller (2), first fiber polarization beam splitter (3), first fiber circulator (4), second fiber polarization controller (5), interferometer (6), wavelength division multiplexer (7), indication laser (8), fiber collimator (9), biaxial scanning galvanometer (10), sample under test (11), light converging collector (12), collimating lens (13), second fiber circulator (14), third fiber polarization controller (15), second fiber polarization beam splitter (16), first photodetector (17), second photodetector (18), third fiber polarization beam splitter (19), third photodetector (20), fourth photodetector (21), feedback control system (22), data acquisition card (23).

DESCRIPTION OF THE EMBODIMENTS

The present disclosure will be further described below in conjunction with the accompanying drawings.

As shown in FIG. 1, the specific instruments for implementation include a narrow-linewidth semiconductor fiber laser 1; a first fiber polarization controller 2; a first fiber polarization beam splitter 3; a first fiber circulator 4; a second fiber polarization controller 5; an interferometer 6; a wavelength division multiplexer 7; an indication laser 8; a fiber collimator 9; a biaxial scanning galvanometer 10; a light converging collector 12; a collimating lens 13; a second fiber circulator 14 and a third fiber polarization controller 15. The output terminal of the narrow-linewidth semiconductor fiber laser 1 is connected to the input terminal of the first fiber polarization beam splitter 3 through the first fiber polarization controller 2. One output terminal of the first fiber polarization beam splitter 3 is connected to the first port of the first fiber circulator 4, and the second port of the first fiber circulator 4 is connected to one end of the interferometer 6 through the second fiber polarization controller 5. The other output terminal of the first fiber polarization beam splitter 3 and the indication laser 8 are jointly connected to two input terminals of the wavelength division multiplexer 7, and the output terminal of the wavelength division multiplexer 7 is connected to the fiber collimator 9. The fiber collimator 9 outputs the collimated beam, which is irradiated to the sample under test 11 through the biaxial scanning galvanometer 10. A light converging collector 12 is disposed above the sample under test 11. The light converging collector 12 receives the scattered light from the sample under test 11, which is incident into the collimating lens 13. The collimating lens 13 is connected to the first port of the second fiber circulator 14. The second port of the second fiber circulator 14 is connected to the other end of the interferometer 6 through the third fiber polarization controller 15.

The narrow-linewidth semiconductor fiber laser 1 emits a continuous laser, which is processed by the first fiber polarization controller 2 to form orthogonally and linearly polarized light with p-polarization state and s-polarization state, and is split by the first fiber polarization beam splitter 3 to form linearly polarized light with p-polarization state and linearly polarized light with s-polarization state. The linearly polarized light in the s-polarization state serves as the reference light, the reference light is incident into the second fiber polarization controller 5 through the first fiber circulator 4, and is input into the interferometer 6 after being polarized by the second fiber polarization controller 5. The linearly polarized light in the p-polarization state serves as the detection light. The detection light and the visible light output by the indication laser 8 are multiplexed by the wavelength division multiplexer 7 and then input to the fiber collimator 9. The fiber collimator 9 starts to output the spatial free light. The spatial free light is irradiated onto the sample under test 11 through the biaxial scanning galvanometer 10. The area illuminated by the sample under test 11 will modulate the ultrasonic vibration information into the detection laser. The scattered light modulated by the ultrasonic vibration is generated by the surface scattering of the sample under test 11. The scattered light is collected and converged by the light converging collector 12 and then incident on the collimating lens 13. After passing through the collimating lens 13, the scattered light becomes a signal light. The signal light is incident into the third fiber polarization controller 15 through the second fiber circulator 14. After being subjected to polarization processing by the third fiber polarization controller 15, the signal light is input into the interferometer 6. Both the reference light and the signal light are reflected and transmitted in the interferometer 6, generating the signal light and reference light transmitted by the interferometer 6, and the signal light and the reference light reflected by the interferometer 6. The signal light transmitted by the interferometer 6 and the reference light reflected by the interferometer 6 are combined and then polarized by the second fiber polarization controller 5, and is incident into the first fiber circulator 4 and output from the third port of the first fiber circulator 4. The reference light transmitted by the interferometer 6 and the signal light reflected by the interferometer 6 are combined and then polarized by the third fiber polarization controller 15, and then is incident into the second fiber circulator 14 and output from the third port of the second fiber circulator 14.

The fiber polarization controller is preferably a three-ring mechanical fiber polarization controller. The second fiber polarization controller 5 and the third fiber polarization controller 15 have a polarization of one-quarter wavelength. The first fiber polarization controller 2 changes the polarization state of linearly polarized light into an elliptically polarized state, and the ratio of p-polarized light to s-polarized light is 90:10.

Specifically, the original reference light undergoes two quarter-wave plate polarization processing through the second fiber polarization controller 5, forming the transmitted and reflected reference light of the interferometer, thereby transforming from s-polarization state to p-polarization state.

Specifically, the original signal light undergoes two quarter-wave plate polarization processing through the third fiber polarization controller 15, thereby forming the transmitted and reflected signal light of the interferometer, thereby transforming from the p-polarization state to s-polarization state.

A second fiber polarization beam splitter 16 and a third fiber polarization beam splitter 19 are further included. The input terminal of the second fiber polarization beam splitter 16 is connected to the third port of the first fiber circulator 4, and the two output terminals of the second fiber polarization beam splitter 16 are respectively connected to a photodetector. The input terminal of the third fiber polarization beam splitter 19 is connected to the third port of the second fiber circulator 14, and the two output terminals of the third fiber polarization beam splitter 19 are also connected to a photodetector respectively.

The photodetectors connected to the two output terminals of the second fiber polarization beam splitter 16 are the first photodetector 17 and the second photodetector 18 respectively, and the photodetectors connected to the two output terminals of the third fiber polarization beam splitter 19 are the third photodetector 20 and the fourth photodetector 21 respectively. The first photodetector 17 and the third photodetector 20 are connected to the feedback control system 22, and the second photodetector 18 and the fourth photodetector 21 are connected to the data acquisition card 23.

The first photodetector 17 receives the signal light transmitted by the interferometer 6 from the second fiber polarization beam splitter 16, the second photodetector 18 receives the reference light reflected by the interferometer 6 from the second fiber polarization beam splitter 16, the third photodetector 20 receives the signal light reflected by the interferometer 6 from the third fiber polarization beam splitter 19, and the fourth photodetector 21 receives the reference light transmitted by the interferometer 6 from the third fiber polarization beam splitter 19.

A feedback control system 22 is further included. The feedback control system 22 is respectively connected to the output terminal port of the reference light that is output by the second fiber polarization beam splitter 16 and the third fiber polarization beam splitter 19 and is reflected and transmitted by the interferometer 6. The feedback control system 22 receives the reference light that has been reflected/transmitted by the interferometer 6, processes the reference light and feeds back the reference light to the interferometer 6, thus adjusting the detection sensitivity of the interferometer 6 in real time to achieve the optimal sensitivity.

A data acquisition card 23 is further included. The data acquisition card 23 is connected to the output terminal port of the signal light that is output by the second fiber polarization beam splitter 16 and the third fiber polarization beam splitter 19 and is reflected and transmitted by the interferometer 6. The data acquisition card 23 collects and receives the signal light that is reflected and transmitted by the interferometer 6 and uses the same as a laser ultrasonic signal, and then the surface quality of the sample under test 11 is subjected to detection and identification processing.

The ultrasound in the sample under test 11 is generated by a pulse laser, that is, a laser pulse is irradiated to the surface of the sample under test to generate thermal expansion stress, thereby exciting ultrasonic waves.

Whereas the ambient temperature and ultrasonic vibrations may affect the parameters within the light beam, resulting in discrepancies in the matching relationship between the beam and the transmission/reflection curves in the interferometer 6, thereby diminishing the interference effect of the interferometer 6 on the light beam. By adjusting the cavity length of the interferometer 6, and consequently modifying the transmission/reflection curves of the interferometer 6, the amplitude and slope corresponding to the fixed operating frequency of the interferometer 6 may be altered, thus enabling the adjustment of sensitivity.

The abscissa of the transmission/reflection curves represents frequency, while the ordinate denotes the light intensity transmission coefficient, indicating the response of light intensity variation. A greater response amplitude signifies superior demodulation efficacy.

In the event of a localized decrease in ambient temperature or a localized reduction in ultrasonic vibration frequency, the transmission/reflection curves of the interferometer 6 shift to the left. Consequently, the amplitude corresponding to the fixed operating frequency of the interferometer 6 increases, and the slope becomes steeper, thereby enhancing sensitivity. Preferably, the cavity length of the interferometer 6 is adjusted to position the amplitude corresponding to the fixed operating frequency at half of the maximum amplitude, thus maximizing the slope and optimizing sensitivity.

Feedback may be provided based on one reference light among the reference lights reflected/transmitted by the interferometer 6.

In a specific implementation, the interferometer 6 includes a pair of mirrors, wherein at least one of which is movable, and the distance between the two mirrors determines the cavity length of the interferometer.

A narrow-linewidth semiconductor fiber laser 1 is configured to generate and provide a laser source for ultrasonic detection. Said laser emits a continuous wave output with a wavelength of 1550 nanometers (nm) and a power output of 100 milliwatts (mW).

The first fiber polarization controller 2 is configured to change the polarization state of continuous laser.

The first fiber polarization beam splitter 3 is configured to split the orthogonally and linearly polarized light contained within the optical fiber into reference light and detection light. Specifically, the implemented first fiber polarization beam splitter 3 has a 1×2 splitting ratio, operates at a wavelength of 1550 nm, and exhibits a light split ratio of 90 between the detection light and reference light.

The indication laser 8 is configured to emit 650 nm visible light, serving to demarcate the position of the detection light.

The wavelength division multiplexer 7 is configured to combine the detection light and the output light of the indication laser 8 and couple them into the same optical fiber for transmission. The operating wavelength is 650/1550 nm.

The fiber collimator 9 is configured to turn the transmitted light in the optical fiber into collimated light.

The biaxial scanning galvanometer 10 is configured to guide the detection beam to different positions on the surface of the sample under test 11 to detect laser ultrasonic signals.

The light converging collector 12 converges and collects the light scattered from the sample under test 11 and couples the scattered light to the optical fiber through the collimating lens 13 to form a signal light, which is then input to the interferometer 6 from the other end through the second fiber circulator 14 and the third fiber polarization controller 15.

The propagation direction of the signal light in the interferometer 6 is opposite to that of the reference light.

The second fiber polarization beam splitter 16 receives the light beam output from the first circulator, which is respectively derived from the signal light transmitted by the interferometer and the reference light reflected by the interferometer. The first output port of the light beam is the signal light transmitted by the interferometer, which is converted into a first ultrasonic signal through the first photodetector 17, the second output port thereof is the reference light reflected by the interferometer, which is converted into a first feedback control signal through the second photodetector 18.

The third fiber polarization beam splitter 19 receives the light beam output from the second circulator, which is respectively derived from the signal light reflected by the interferometer and the reference light transmitted by the interferometer. The first output port of the light beam is the signal light reflected by the interferometer, which is converted into a second ultrasonic signal through the third photodetector 20. The second output port thereof is the reference light transmitted by the interferometer, which is converted into a second feedback control signal through the fourth photodetector 21.

The collimator facilitates the coupling of laser between optical fiber and free space. The fiber collimator 9 couples the detection light and indicator light from the optical fiber to free space, while the collimating lens 13 couples the scattered signal light into the optical fiber.

The photodetectors 17 and 20 convert the signal light and output an ultrasonic signal, and the photodetectors 18 and 21 convert the reference light and output a feedback control signal.

The feedback control system 22 receives the first and second feedback control signals, adjusts the cavity length of the interferometer in real time according to one of the first and second feedback control signals, and modulates the cavity length of the interferometer in real time based on the feedback control signal to stabilize the cavity length of the interferometer at the optimal detection performance.

The data acquisition card 23 stores the first and second ultrasonic signals and performs post-processing for ultrasonic measurement of the sample under test, stores and processes the ultrasonic signals, and implements ultrasonic measurement of the sample under test. The data acquisition card 23 is configured to implement functions such as thickness measurement for the sample under test, defect imaging, and material characterization.

The biaxial scanning galvanometer 10 outputs the detection light, which may be deflected and scanned in the X and Y directions, guiding the detection light to be incident obliquely to any detection position of the sample under test 11.

In the specific implementation, the optical path is split to generate reference light and detection light, the detection light is incident on the target object of the sample under test 11 to modulate ultrasonic vibration. The scattered light scattered by the sample under test 11 is converged and collected and coupled to the optical fiber after photoelectric conversion to obtain the signal light modulated by ultrasonic vibration. The signal light and reference light are input into the interferometer 11 through different optical fiber circulators and polarization controllers.

Within the cavity of the interferometer 11, the reference light is output after interference. The reference light output from the interference is detected by a photoelectric detector, which produces a feedback control signal. This signal is subsequently configured to adjust the cavity length of the interferometer, thereby providing feedback regulation and optimization of the detection sensitivity performance of the interferometer. The signal light output from the interference is detected by a photoelectric detector, generating an ultrasonic signal that enables ultrasonic measurement of the sample under test 11. The ultrasonic wave measurement of the sample under test 11 may include, but is not limited to, thickness measurement, defect imaging, and characterization of material property parameters.

During the measurement process, the following method is used for signal compensation. The laser ultrasonic signals scanned and collected by the biaxial scanning galvanometer 10 at different positions are combined into a combined signal, and the combined signal is subjected to Hilbert transformation and then subjected to envelope processing to obtain the surface wave. For the envelope signal, the signal with the largest amplitude among the surface wave envelope signals serves as the reference signal, and each surface wave envelope signal is normalized according to the reference signal. After normalization, the signal intensity and signalto-noise ratio of areas with poor surface quality of the sample under test are improved, and then the processed combined signal is formed into an image. Areas with poor quality may also be clearly displayed on the same image, thus achieving high-sensitivity measurement of the surface of the sample under test.

The present disclosure is characterized by its compact structure, high portability, and ease of maintenance and adjustment.

Figure 2:
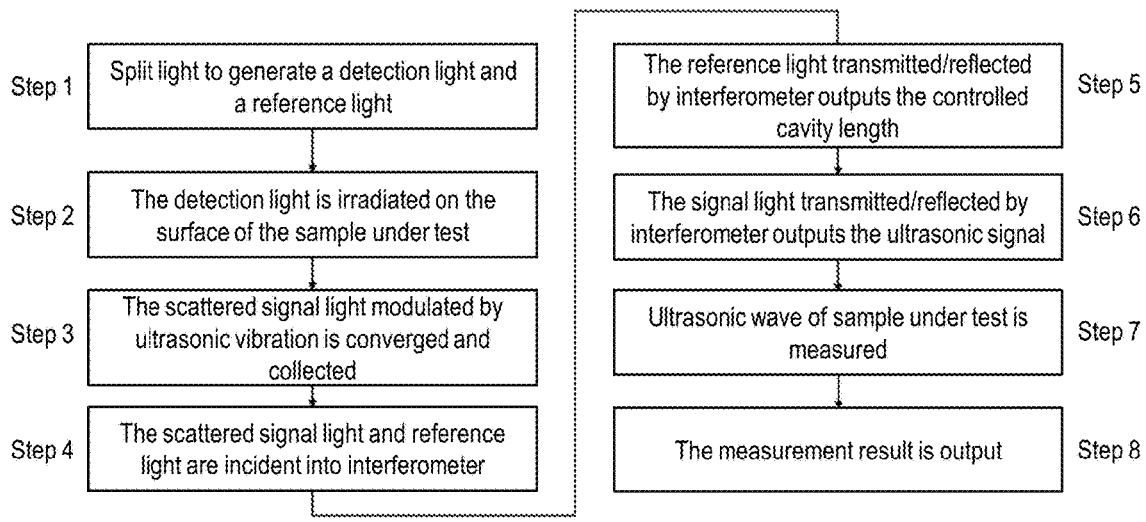
FIG. 2 is a work flow chart of the laser ultrasonic measurement system of the present disclosure.

FIG. 2 is a work flow chart of the laser ultrasonic measurement system of the present disclosure.

In step 1, the light output by the narrow-linewidth fiber semiconductor laser is split by a polarization controller and a polarization beam splitter to generate detection light and reference light.

In step 2, the detection light is irradiated to the sample under test through the wavelength division multiplexer and the biaxial scanning galvanometer, and the indicator laser is configured to mark the irradiation position of the detection light.

In step 3, the scattered light modulated by ultrasonic vibration is converged and collected as signal light for input.

In step 4, the signal light and reference light are input to the interferometer from both ends of the interferometer in opposite propagation directions.

In step 5, the transmitted/reflected reference light demodulated by the interferometer generates a feedback control signal, which is configured to adjust the cavity length of the interferometer to work stably at optimal detection sensitivity performance.

In step 6, the transmitted/reflected signal light demodulated by the interferometer generates an ultrasonic signal.

In step 7, the received ultrasonic signal is configured to implement measurement of the sample under test.

In step 8, the ultrasonic measurement results of the sample under test, such as thickness, defects, material properties, and so on are output.

Figure 3:
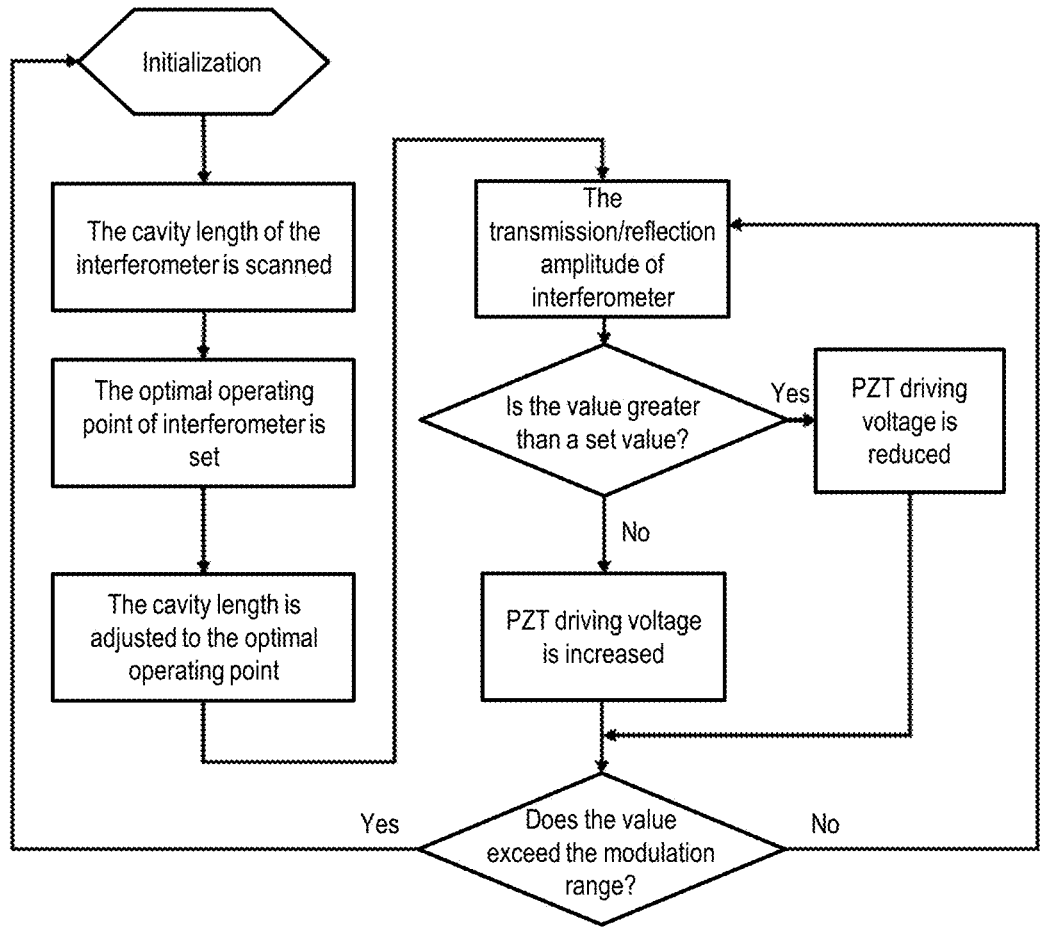
FIG. 3 is an optimal detection sensitivity control flow chart of the interferometer.

FIG. 3 is an optimal detection sensitivity control flow chart of the interferometer, and the operating process is mainly as follows.

The cavity length of the interferometer is scanned to obtain transmission/reflection curves of the interferometer.

The cavity length of the interferometer corresponding to the maximum slope point is selected according to the transmission/reflection curves and used as the stable operating point.

The cavity length of the interferometer is adjusted to the optimal operating point.

The cavity length is adjusted based on the feedback control signal generated by the reference light transmitted/reflected by the interferometer. If the amplitude is greater than the set value, the PZT driving voltage is reduced, otherwise, the PZT driving voltage is increased until the cavity length is stabilized at the optimal operating point.

The cavity length of the interferometer is adjusted by adjusting the PZT driving voltage. If the PZT driving voltage is reduced, the cavity length of the interferometer will be reduced.

In the meantime, during the adjustment process, it is determined whether the cavity length of the interferometer exceeds the adjustment range. If so, initialization should be performed for a restart.

The present disclosure, characterized by high environmental adaptability, employs a reference light to provide real-time adaptive compensation for laser frequency drift and variations of interferometer cavity length caused by industrial environmental changes and deformations of the interferometer itself. This mechanism enables the interferometer to consistently maintain its optimal operational state, thereby meeting the demands of industrial applications in high-temperature, high-vibration, and other challenging environments.

Figure 4:
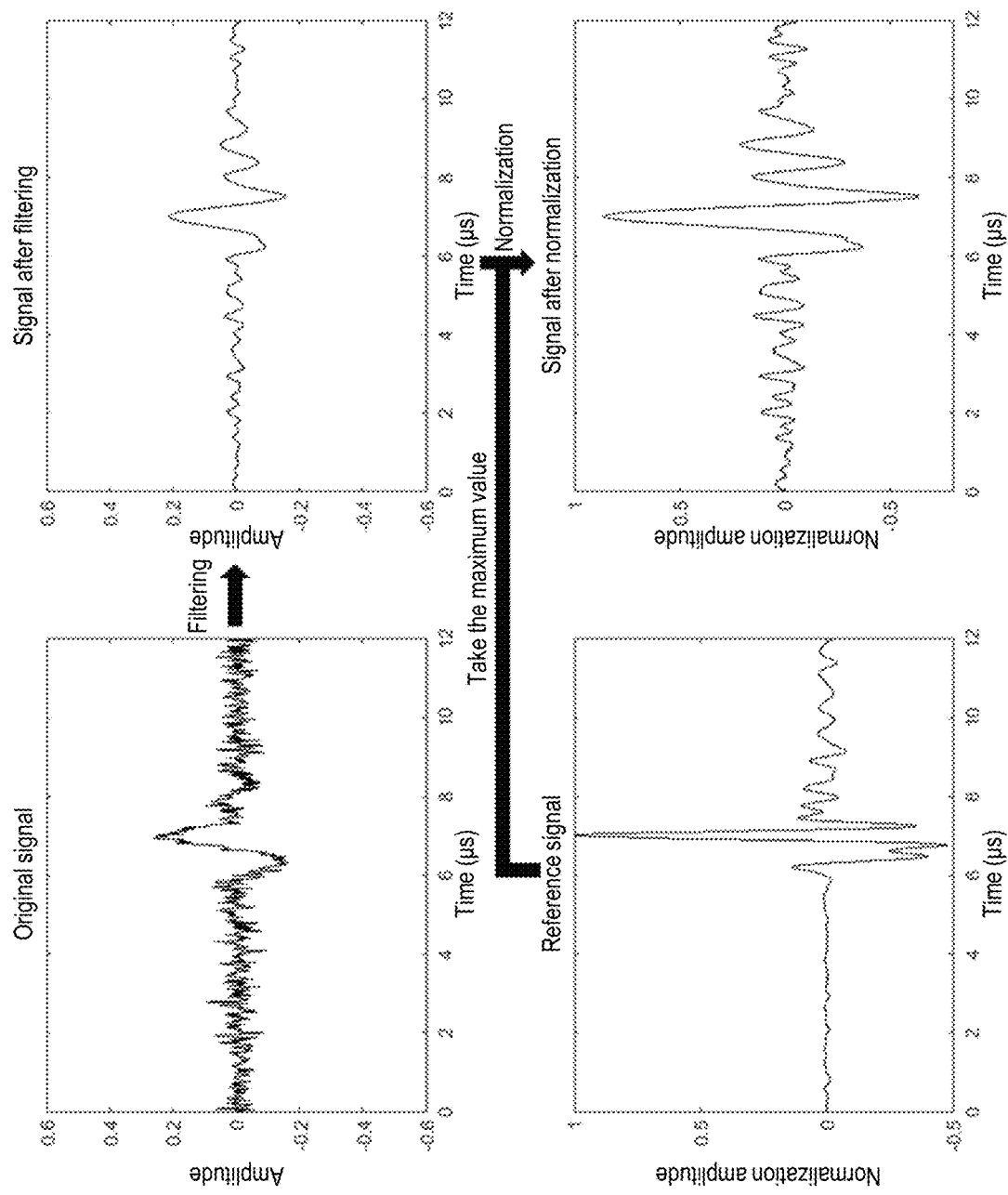
FIG. 4 is a schematic diagram of the automatic compensation method of laser ultrasonic signals based on normalization.

As shown in FIG. 4, the present disclosure also performs automatic compensation of laser ultrasonic signals based on normalization for signal measurement. The processing process is as follows.

Step 1: Laser ultrasonic signals are acquired from various positions through point-by-point scanning using a biaxial scanning galvanometer, and are saved in the data acquisition system.

Step 2: Envelope processing is applied to the laser ultrasonic signals respectively after subjecting them to Hilbert transformation.

Step 3: The laser ultrasonic signal with the maximum amplitude surface wave serves as the reference signal, and normalization processing is performed through surface waves respectively.

The present disclosure exhibits high detection sensitivity and is capable of adaptively compensating for weak laser ultrasonic signals and low signal-to-noise ratios caused by poor surface quality of the sample under test.

For practitioners familiar with the related field, one or more devices in the present disclosure may be implemented in a more discrete or integrated manner, or even appropriately removed or added as optical components in certain specific application scenarios.

The aforementioned description constitutes merely one preferred embodiment of the present disclosure and is not intended to limit the scope thereof. Any approximate modifications, equivalent substitutions, and improvements made within the spirit and principles of the present disclosure should be encompassed within the scope to be protected by the present disclosure.

What is claimed is:

1. A self-adaptive all-fiber laser ultrasonic measuring instrument, comprising: a narrow-linewidth semiconductor fiber laser; a first fiber polarization controller; a first fiber polarization beam splitter; a first fiber circulator; a second fiber polarization controller; an interferometer; a wavelength division multiplexer; an indication laser; a fiber collimator; a biaxial scanning galvanometer; a light converging collector; a collimating lens; a second fiber circulator; and a third fiber polarization controller, wherein an output terminal of the narrow-linewidth semiconductor fiber laser is connected to an input terminal of the first fiber polarization controller and the first fiber polarization beam splitter, an output terminal of the first fiber polarization beam splitter is connected to a first port of the first fiber circulator, a second port of the first fiber circulator is connected to one end of the interferometer through the second fiber polarization controller, the other output terminal of the first fiber polarization beam splitter and the indication laser are jointly connected to two input terminals of the wavelength division multiplexer, an output terminal of the wavelength division multiplexer is connected to the fiber collimator, an output collimated beam of the fiber collimator is irradiated to a sample under test through the biaxial scanning galvanometer, the light converging collector is disposed above the sample under test, the light converging collector receives a scattered light from the sample under test and then enters the collimating lens, the collimating lens is connected to a first port of the second fiber circulator, and a second port of the second fiber circulator is connected to the other end of the interferometer through the third fiber polarization controller, wherein,
the narrow-linewidth semiconductor fiber laser emits a continuous laser, which is polarized by the first fiber polarization controller to form orthogonally and linearly polarized light with p-polarization state and s-polarization state, and is split by the first fiber polarization beam splitter to form linearly polarized light with the p-polarization state and linearly polarized light with the s-polarization state,
the linearly polarized light in the s-polarization state serves as a reference light, the reference light is incident into the second fiber polarization controller through the first fiber circulator, and is input into the interferometer after being polarized by the second fiber polarization controller,
the linearly polarized light in the p-polarization state serves as a detection light, the detection light and a visible light output by the indication laser are jointly multiplexed by the wavelength division multiplexer and then input to the fiber collimator, the fiber collimator outputs a spatial free light, the spatial free light generates ultrasonic vibrations when being irradiated on the sample under test after passing through the biaxial scanning galvanometer, and scattered on a surface of the sample under test to generate a scattered light modulated by the ultrasonic vibrations, the scattered light is collected and converged by the light converging collector and then incident on the collimating lens, and becomes a signal light after passing through the collimating lens, the signal light is incident into the third fiber polarization controller through the second fiber circulator, and is input into the interferometer after being polarized by the third fiber polarization controller,
both the reference light and the signal light are reflected and transmitted in the interferometer,
the signal light transmitted by the interferometer and the reference light reflected by the interferometer are combined and incident into the first fiber circulator through the second fiber polarization controller, and are output from a third port of the first fiber circulator, and
the reference light transmitted by the interferometer and the signal light reflected by the interferometer are combined and incident into the second fiber circulator through the third fiber polarization controller, and are output from a third port of the second fiber circulator.

2. The self-adaptive all-fiber laser ultrasonic measuring instrument according to claim 1, wherein,
the fiber polarization controller is a three-ring mechanical fiber polarization controller, the second fiber polarization controller and the third fiber polarization controller have a polarization of one-quarter wavelength, wherein the first fiber polarization controller changes a polarization state of the linearly polarized light into an elliptically polarized state, and a ratio of p-polarized light to s-polarized light is 90:10.

3. A measurement method applied to the self-adaptive all-fiber laser ultrasonic measuring instrument according to claim 2, wherein light is split to generate the reference light and the detection light, the detection light is incident on a target object of the sample under test to modulate the ultrasonic vibrations, the scattered light scattered by the sample under test is converged and collected and coupled to an optical fiber after photoelectric conversion to obtain a signal light that is modulated by the ultrasonic vibrations, the signal light and the reference light are input into the interferometer through a fiber circulator and a polarization controller, the signal light and the reference light are output through interference in an inner cavity of the interferometer, the reference light output by the interference is generated by the photodetector to generate a feedback control signal, which is then used to adjust the cavity length of the interferometer, then a feedback adjustment optimizes a detection sensitivity performance of the interferometer, and the signal light output from the interference outputs an ultrasonic signal generated by the photodetector to achieve ultrasonic measurement of the sample under test.

4. The measurement method of the self-adaptive all-fiber laser ultrasonic measuring instrument according to claim 3, wherein, during a measurement process, the following method is used for signal compensation: laser ultrasonic signals scanned and collected at different positions by the biaxial scanning galvanometer are combined into a combined signal, the combined signal is subjected to Hilbert transformation and then envelope processing is performed to obtain surface wave envelope signals, a signal with a largest amplitude among the surface wave envelope signals is taken as a reference signal, and each of the surface wave envelope signals is normalized according to the reference signal.

5. The self-adaptive all-fiber laser ultrasonic measuring instrument according to claim 1,
further comprising: a second fiber polarization beam splitter and a third fiber polarization beam splitter, wherein an input terminal of the second fiber polarization beam splitter is connected to a third port of the first fiber circulator, and two output terminals of the second fiber polarization beam splitter are respectively connected to a photodetector, wherein an input terminal of the third fiber polarization beam splitter is connected to a third port of the second fiber circulator, and two output terminals of the third fiber polarization beam splitter are also respectively connected to a photodetector.

6. A measurement method applied to the self-adaptive all-fiber laser ultrasonic measuring instrument according to claim 5, wherein light is split to generate the reference light and the detection light, the detection light is incident on a target object of the sample under test to modulate the ultrasonic vibrations, the scattered light scattered by the sample under test is converged and collected and coupled to an optical fiber after photoelectric conversion to obtain a signal light that is modulated by the ultrasonic vibrations, the signal light and the reference light are input into the interferometer through a fiber circulator and a polarization controller, the signal light and the reference light are output through interference in an inner cavity of the interferometer, the reference light output by the interference is generated by the photodetector to generate a feedback control signal, which is then used to adjust the cavity length of the interferometer, then a feedback adjustment optimizes a detection sensitivity performance of the interferometer, and the signal light output from the interference outputs an ultrasonic signal generated by the photodetector to achieve ultrasonic measurement of the sample under test.

7. The measurement method of the self-adaptive all-fiber laser ultrasonic measuring instrument according to claim 6, wherein, during a measurement process, the following method is used for signal compensation: laser ultrasonic signals scanned and collected at different positions by the biaxial scanning galvanometer are combined into a combined signal, the combined signal is subjected to Hilbert transformation and then envelope processing is performed to obtain surface wave envelope signals, a signal with a largest amplitude among the surface wave envelope signals is taken as a reference signal, and each of the surface wave envelope signals is normalized according to the reference signal.

8. The self-adaptive all-fiber laser ultrasonic measuring instrument according to claim 1, further comprising: a feedback control system, which is respectively connected to an output terminal port of a reference light that is output by the second fiber polarization beam splitter and the third fiber polarization beam splitter and is reflected and transmitted by the interferometer, wherein the feedback control system receives the reference light that has been reflected/transmitted by the interferometer, and then processes and feedbacks the reference light to the interferometer to adjust a detection sensitivity of the interferometer in real time.

9. A measurement method applied to the self-adaptive all-fiber laser ultrasonic measuring instrument according to claim 8, wherein light is split to generate the reference light and the detection light, the detection light is incident on a target object of the sample under test to modulate the ultrasonic vibrations, the scattered light scattered by the sample under test is converged and collected and coupled to an optical fiber after photoelectric conversion to obtain a signal light that is modulated by the ultrasonic vibrations, the signal light and the reference light are input into the interferometer through a fiber circulator and a polarization controller, the signal light and the reference light are output through interference in an inner cavity of the interferometer, the reference light output by the interference is generated by the photodetector to generate a feedback control signal, which is then used to adjust the cavity length of the interferometer, then a feedback adjustment optimizes a detection sensitivity performance of the interferometer, and the signal light output from the interference outputs an ultrasonic signal generated by the photodetector to achieve ultrasonic measurement of the sample under test.

10. The measurement method of the self-adaptive all-fiber laser ultrasonic measuring instrument according to claim 9, wherein, during a measurement process, the following method is used for signal compensation: laser ultrasonic signals scanned and collected at different positions by the biaxial scanning galvanometer are combined into a combined signal, the combined signal is subjected to Hilbert transformation and then envelope processing is performed to obtain surface wave envelope signals, a signal with a largest amplitude among the surface wave envelope signals is taken as a reference signal, and each of the surface wave envelope signals is normalized according to the reference signal.

11. The self-adaptive all-fiber laser ultrasonic measuring instrument according to claim 1, further comprising: a data acquisition card, which is respectively connected to an output terminal port of a signal light that is output by the second fiber polarization beam splitter and the third fiber polarization beam splitter and is reflected and transmitted by the interferometer, wherein the signal light that is reflected and transmitted by the interferometer is collected and received by the data acquisition card and used as a laser ultrasonic signal, and then a surface quality of the sample under test is detected and identified.

12. A measurement method applied to the self-adaptive all-fiber laser ultrasonic measuring instrument according to claim 11, wherein light is split to generate the reference light and the detection light, the detection light is incident on a target object of the sample under test to modulate the ultrasonic vibrations, the scattered light scattered by the sample under test is converged and collected and coupled to an optical fiber after photoelectric conversion to obtain a signal light that is modulated by the ultrasonic vibrations, the signal light and the reference light are input into the interferometer through a fiber circulator and a polarization controller, the signal light and the reference light are output through interference in an inner cavity of the interferometer, the reference light output by the interference is generated by the photodetector to generate a feedback control signal, which is then used to adjust the cavity length of the interferometer, then a feedback adjustment optimizes a detection sensitivity performance of the interferometer, and the signal light output from the interference outputs an ultrasonic signal generated by the photodetector to achieve ultrasonic measurement of the sample under test.

13. The measurement method of the self-adaptive all-fiber laser ultrasonic measuring instrument according to claim 12, wherein, during a measurement process, the following method is used for signal compensation: laser ultrasonic signals scanned and collected at different positions by the biaxial scanning galvanometer are combined into a combined signal, the combined signal is subjected to Hilbert transformation and then envelope processing is performed to obtain surface wave envelope signals, a signal with a largest amplitude among the surface wave envelope signals is taken as a reference signal, and each of the surface wave envelope signals is normalized according to the reference signal.

14. The self-adaptive all-fiber laser ultrasonic measuring instrument according to claim 1, wherein, by adjusting a cavity length of the interferometer, transmission/reflection curves of the interferometer are adjusted, and an amplitude and a slope corresponding to a fixed operating frequency of the interferometer are adjusted, thereby adjusting a sensitivity.

15. A measurement method applied to the self-adaptive all-fiber laser ultrasonic measuring instrument according to claim 14, wherein light is split to generate the reference light and the detection light, the detection light is incident on a target object of the sample under test to modulate the ultrasonic vibrations, the scattered light scattered by the sample under test is converged and collected and coupled to an optical fiber after photoelectric conversion to obtain a signal light that is modulated by the ultrasonic vibrations, the signal light and the reference light are input into the interferometer through a fiber circulator and a polarization controller, the signal light and the reference light are output through interference in an inner cavity of the interferometer, the reference light output by the interference is generated by the photodetector to generate a feedback control signal, which is then used to adjust the cavity length of the interferometer, then a feedback adjustment optimizes a detection sensitivity performance of the interferometer, and the signal light output from the interference outputs an ultrasonic signal generated by the photodetector to achieve ultrasonic measurement of the sample under test.

16. The measurement method of the self-adaptive all-fiber laser ultrasonic measuring instrument according to claim 15, wherein, during a measurement process, the following method is used for signal compensation: laser ultrasonic signals scanned and collected at different positions by the biaxial scanning galvanometer are combined into a combined signal, the combined signal is subjected to Hilbert transformation and then envelope processing is performed to obtain surface wave envelope signals, a signal with a largest amplitude among the surface wave envelope signals is taken as a reference signal, and each of the surface wave envelope signals is normalized according to the reference signal.

17. A measurement method applied to the self-adaptive all-fiber laser ultrasonic measuring instrument according to claim 1, wherein light is split to generate the reference light and the detection light, the detection light is incident on a target object of the sample under test to modulate the ultrasonic vibrations, the scattered light scattered by the sample under test is converged and collected and coupled to an optical fiber after photoelectric conversion to obtain a signal light that is modulated by the ultrasonic vibrations, the signal light and the reference light are input into the interferometer through a fiber circulator and a polarization controller, the signal light and the reference light are output through interference in an inner cavity of the interferometer, the reference light output by the interference is generated by the photodetector to generate a feedback control signal, which is then used to adjust the cavity length of the interferometer, then a feedback adjustment optimizes a detection sensitivity performance of the interferometer, and the signal light output from the interference outputs an ultrasonic signal generated by the photodetector to achieve ultrasonic measurement of the sample under test.

18. The measurement method of the self-adaptive all-fiber laser ultrasonic measuring instrument according to claim 17, wherein, during a measurement process, the following method is used for signal compensation: laser ultrasonic signals scanned and collected at different positions by the biaxial scanning galvanometer are combined into a combined signal, the combined signal is subjected to Hilbert transformation and then envelope processing is performed to obtain surface wave envelope signals, a signal with a largest amplitude among the surface wave envelope signals is taken as a reference signal, and each of the surface wave envelope signals is normalized according to the reference signal.

* * * * *